No. 738,972. PATENTED SEPT. 15, 1903.
S. A. BAKER.
MACHINE FOR SOLDERING CANS.
APPLICATION FILED APR. 29, 1901.
NO MODEL. 4 SHEETS—SHEET 1.
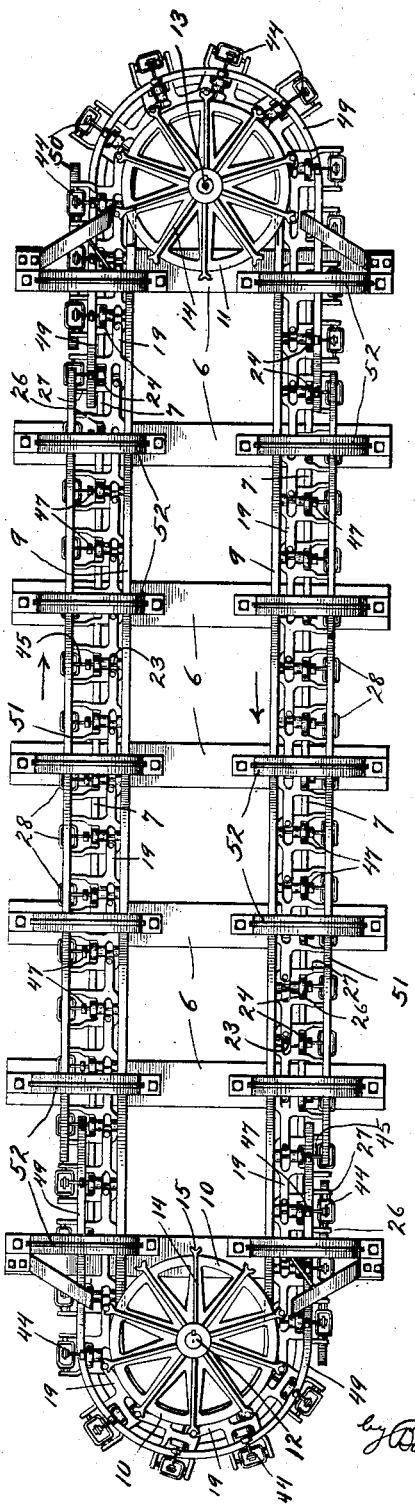
Witnesses
Ira D. Perry
A. L. Romme.
Inventor
Samuel A. Baker,
by Bond Adams Pickard Jackson
his Attys

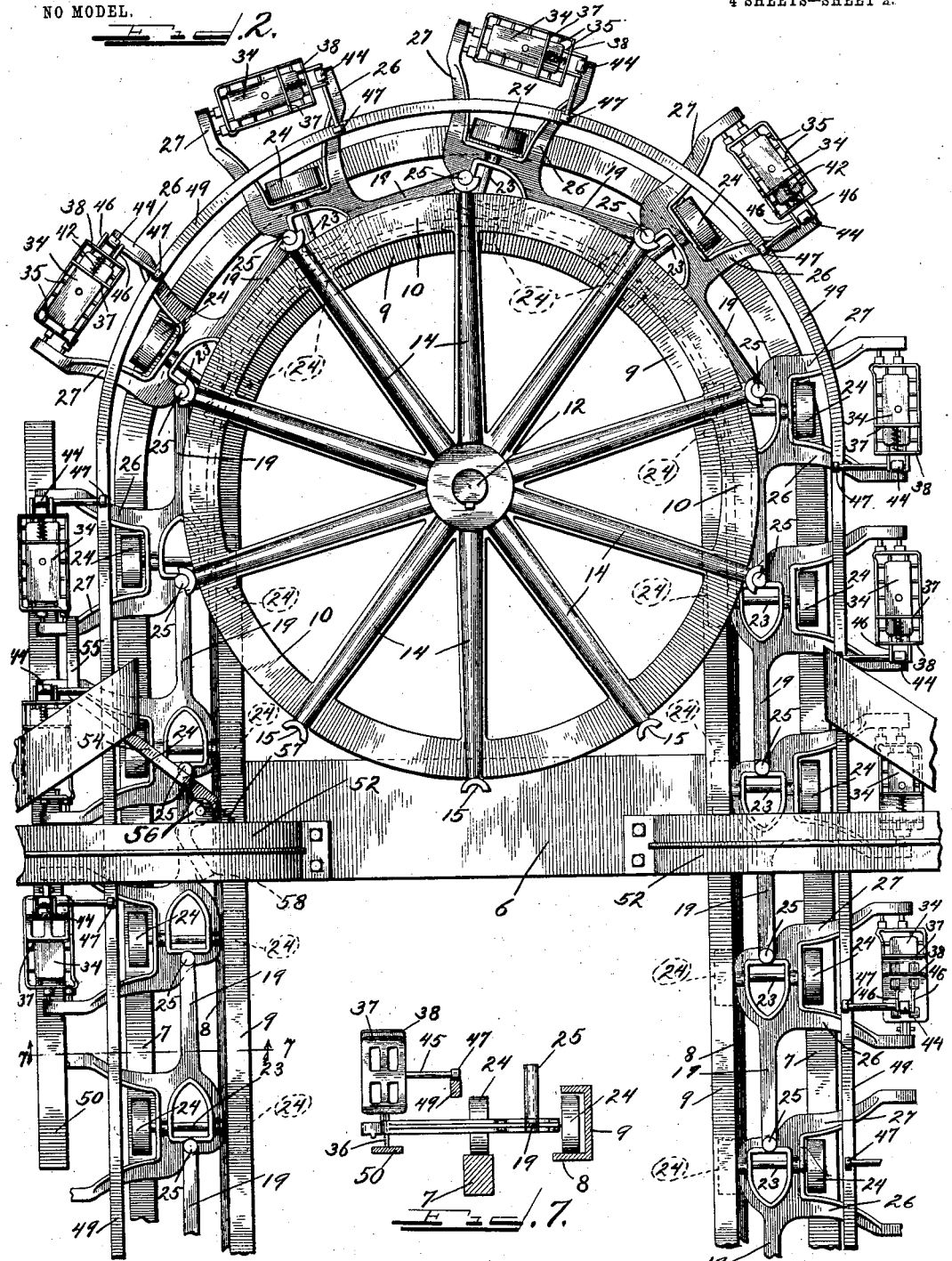

No. 738,972. PATENTED SEPT. 15, 1903.
S. A. BAKER.
MACHINE FOR SOLDERING CANS.
APPLICATION FILED APR. 29, 1901.
NO MODEL. 4 SHEETS—SHEET 3.
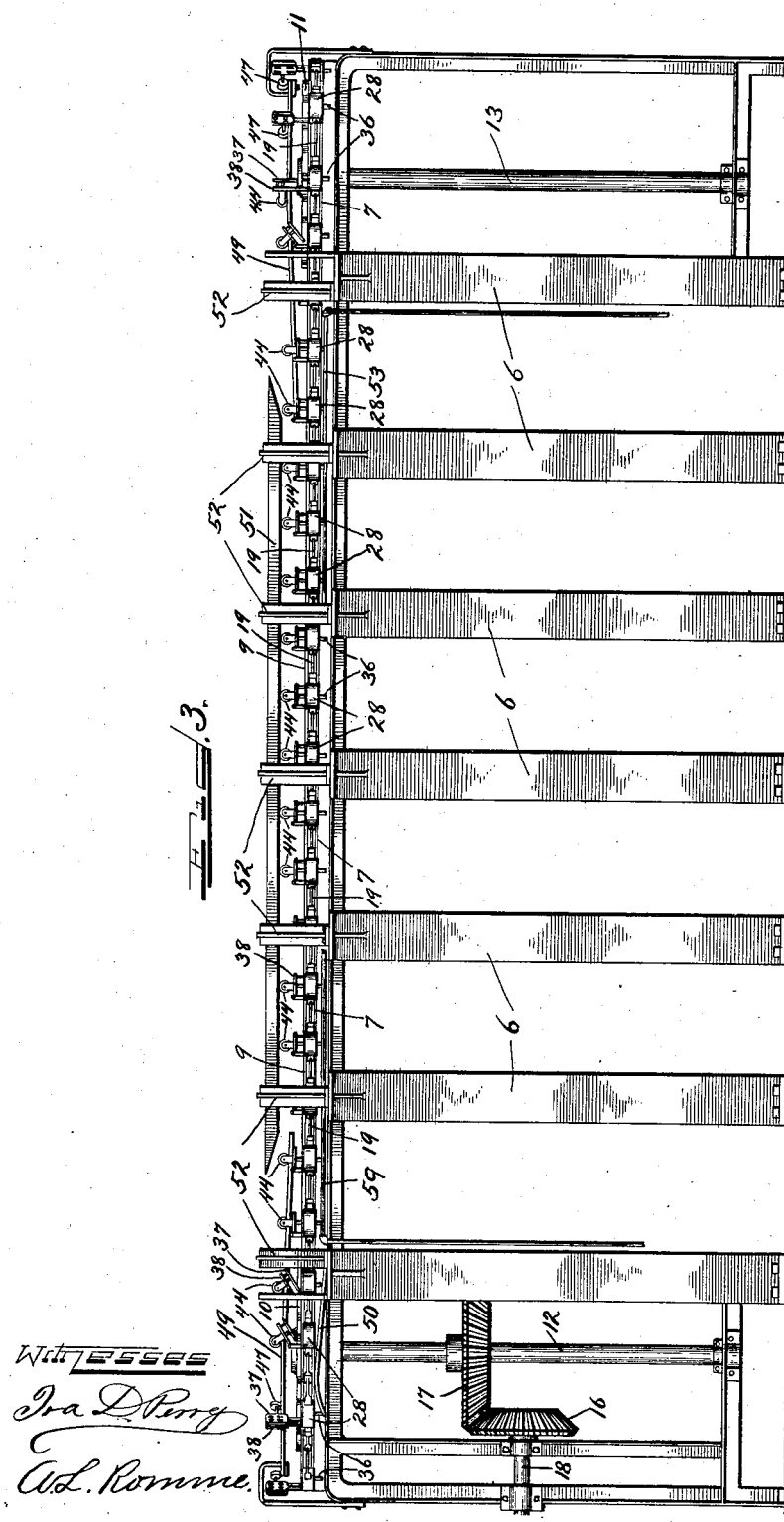

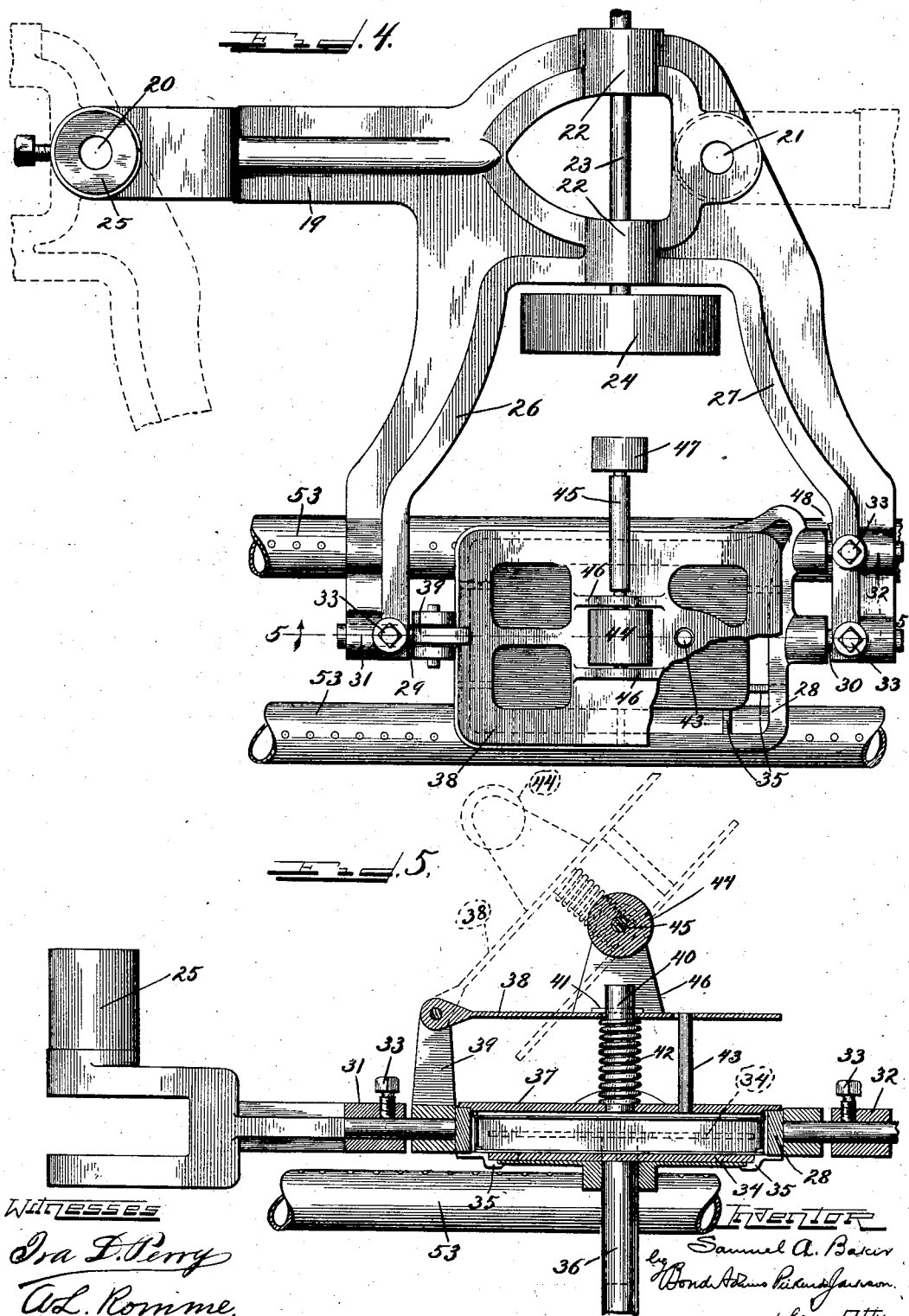

No. 738,972.                                                              Patented September 15, 1903.

UNITED STATES PATENT OFFICE.

SAMUEL A. BAKER, OF EASTPORT, MAINE, ASSIGNOR, BY MESNE ASSIGNMENTS, TO AMERICAN KEY CAN COMPANY, OF CHICAGO, LLINOIS, A CORPORATION OF NEW JERSEY.

MACHINE FOR SOLDERING CANS.

SPECIFICATION forming part of Letters Patent No. 738,972, dated September 15, 1903.

Application filed April 29, 1901. Serial No. 57,991. (No model.)

*To all whom it may concern:*

Be it known that I, SAMUEL A. BAKER, a citizen of the United States, residing at Eastport, in the county of Washington and State of Maine, have invented certain new and useful Improvements in Machines for Soldering Cans, of which the following is a specification, reference being had to the accompanying drawings.
My invention relates to machines for the manufacture of sheet-metal cans, and has for its object to provide a machine by which the soldering operation may be completed in cans after solder has been applied to the surfaces to be joined, as set forth in my application for patent for improvements in machines for applying solder to sheet metal of even date herewith, Serial No. 57,990, filed April 29, 1901. The can particularly described in my said application is a sardine-can and consists of a body portion having at one edge an inwardly-projecting flange extending around its perimeter and at the other edge an outwardly-projecting flange. What is termed the "top" is secured to the inwardly-projecting flange of the can-body, while the bottom is secured to the outwardly-projecting flange. The machine described in my said application is designed to apply solder to one of the flanges above referred to, so that the top or bottom, as the case may be, may afterward be applied thereto and soldered in position by simply bringing the parts together and subjecting them to heat sufficiently great to melt the solder, and my present application has to do with a machine for carrying out the latter step. To this end my improved machine is provided with a carrier adapted to conduct the can bodies and tops through the machine, the carrier being provided with means for holding the top or bottom, as the case may be, in contact with the flange to which it is to be soldered until the soldering operation is completed. (I shall hereinafter use the term "top" in describing the part to be soldered to the can-body; but I wish it understood that the term is used in a generic sense as indicating the part to be soldered to the can-body, whether it be a top, bottom, or other part or piece.) It is further provided with means for heating the parts along the line of the seam sufficiently to melt the solder, causing it to flow and unite the top with the body. In order to discharge the can, the machine is provided with mechanism operating to release the can-body, with the attached top, from the clamping devices and discharge it from the carrier, all the different parts of the mechanism being arranged to operate automatically, so that after the can-bodies have been placed in the machine they require no further attention until after they are discharged therefrom.

That which I regard as new will be set forth in the claims.

In the accompanying drawings, which illustrate one embodiment of my invention, Figure 1 is a plan view. Fig. 2 is an enlarged plan view of one end of the machine. Fig. 3 is a side elevation. Fig. 4 is an enlarged detail, being a plan view of part of the clamping devices. Fig. 5 is a section on line 5 5 of Fig. 4. Fig. 6 is a detail illustrating the arrangement of the discharging devices, and Fig. 7 is a cross-section on line 7 7 of Fig. 2.
Referring to the drawings, 6 indicates a series of standards, preferably U-shaped, which support the parts of the machine. Said standards are arranged somewhat in the form of an ellipse, thereby giving the frame of the machine the form of an elongated ellipse, as shown in Fig. 1.

7 8 indicate outer and inner rails mounted on top of the standards 6, as best shown in Fig. 2.
9 indicates a guard-rail, which extends over the inner rail 8 and preferably is formed integral therewith, said rails being best constructed by taking a channel-bar and mounting it on its side on the standards 6.
10 11 indicate drive-wheels mounted near the ends of the machine on shafts 12 13, respectively, and adapted to rotate on vertical axes. The wheels 10 11 are provided with radial arms 14, having recesses 15 in their outer ends for a purpose which will be hereinafter described. The diameter of said wheels is somewhat greater than what may be termed the "minor axis" of the machine at the rail 8, so that said arms 14 extend beyond said rail, terminating about midway between the rails 7 8, as shown in Fig. 2. The shaft 12 is driven from a beveled gear 16 by means of a gear 17, which is mounted on said shaft, as shown in Fig. 3, the gear 16 being driven from any suitable source of power applied to a shaft 18, on which said gear 16 is mounted. Other suitable driving mechanism for the shaft 12 may, however, be employed, if desired.

The wheel 11 is driven from the wheel 10 by means of a carrier composed of a number of sections pivoted together, forming in effect a link belt. The construction of said carrier is best shown in Figs. 2, 4, and 5. In Fig. 4 a single section of the carrier is illustrated. As therein shown, each of said sections consists of a link 19, having vertically-arranged pivot-bearings 20 21 at its ends, by which it is pivotally connected to corresponding links, so that the links 19 of all the sections taken together form an endless chain or link belt. As shown in Fig. 5, the forward end of the link 19 is bifurcated to adapt it to fit over the bearing 21 of the preceding link. Near its rear end the link 19 is provided with bosses 22, forming bearings for a transverse shaft 23, upon the ends of which are mounted wheels 24. (See dotted lines in Fig. 2.) Said wheels lie over the rails 7 8, upon which they travel. As shown in Fig. 5, bosses 25 project vertically from the links 19 at the pivot-bearings 20, which bosses are adapted to fit into the recesses 15 in the arms 14 of the wheels 10 11, as shown in Fig. 2, so that as said wheels rotate the carrier is caused to rotate, the different sections traveling along the rails 7 8 on their wheels 24. Each link 19 is provided with laterally-projecting arms 26 27, forming a yoke which projects outward, as shown in Figs. 2 and 4, and between the outer ends of said arms 26 27 is pivoted a can-carrying frame 28. The can-carrying frame is best shown in Figs. 4 and 5, from an inspection of which it will be seen that it consists of a rectangular frame of suitable shape to receive a can, having trunnions 29 30 projecting from its front and rear ends, which trunnions fit in sockets 31 32 in the arms 26 27, respectively, and are held securely in place by set-screws 33. The frame 28 is provided with a vertically-movable bottom plate 34, which rests on inwardly-projecting lugs 35, carried by the frame, and carries a downwardly-projecting rod 36, preferably arranged centrally, as shown in Fig. 5. The frame 28 is also provided with a cover-plate 37, which is vertically movable, being carried by a swinging plate 38, pivoted upon an arm 39, rising from the frame 28, as shown in Fig. 5. Said plate 37 is secured to the plate 38 by a pin 40, the lower end of which is riveted to the plate 37, its upper end projecting through the plate 38 and being secured by a key 41. A spring 42 is mounted on the pin 40 between the two plates 37 38 and acts to press said plates apart, the plate 37 thereby being yieldingly held away from the plate 38.

43 indicates a guide-pin secured to the plate 37 and projecting through the plate 38, as shown in Fig. 5.

44 indicates a roller mounted on a pivot 45, carried by lugs 46, rising from the plate 38, as shown in Figs. 4 and 5. Obviously, by bearing down on the roller 44 the plate 38 will be pressed toward the plate 37, compressing the spring 42, and consequently pressing the plate 37 down more tightly on the frame 28. The ends of the plate 37 project over the frame 28, so that said plate 37 cannot move down beyond the point where it rests on the frame. As shown in Fig. 4, the pin 45, which carries the roller 44, extends inwardly—that is, toward the link 19—beyond the inner edge of the frame 28 and carries a roller 47, the object of which will be hereinafter stated.

48 indicates a pin carried by the frame 28, near the pin 30, said pin 48 projecting into a suitable bearing in the arm 27, as shown in Fig. 4, thereby preventing the frame 28 from rocking on its trunnions 29 30.

As stated, the carrier is made up of a number of sections, such as that just described, and therefore as the wheels 10 11 rotate the carrier will also be rotated, the sections moving around the wheels and from end to end of the machine, as illustrated in Fig. 1, the frames 28 lying outside of the rail 7, the rollers 47, carried by the frames 28, projecting inward toward said rail. Said rollers 47 are for the purpose of raising the cover-plates 37, and to this end cam-rails 49 are provided at appropriate points, which lie in the path of said rollers 47 and are inclined so that said rollers ride upon said rails and are gradually raised, carrying up the plates 38 37 to the position shown in dotted lines in Fig. 5, permitting the can-bodies to be discharged from the frames 28. The discharge of the can-bodies from the frames 28 is effected by cam-plates 50, arranged in the path of the pins 36, which depend from the bottom plates 34, said cam-plates 50 being also inclined, as shown in Fig. 3, so that as the carrier moves forward the pins 36 ride up on the plates 50, carrying the bottom plates 34 up and raising the can-bodies clear of the frames 28.

In the construction shown the machine is double acting—that is to say, can-bodies are fed into it at both ends and are discharged at both ends, the can-bodies fed in at one end being discharged at the other. Consequently two cam-rails 49 and two cam-plates 50 are provided arranged at opposite ends of the machine, as shown in Fig. 1. The specific arrangement of the said cam rails and plates is best shown in Fig. 2, from which it will be seen that the cam-rail 49 commences near one end of the machine and extends around the adjacent end, terminating at the opposite side of the machine. Each cam-plate 50 is arranged near the end of the machine and at one side only, lying outside of and parallel with the adjacent portion of the cam-rail 49.

The function of the roller 44, carried by the plate 38, is to cause the plate 38 and the cover-plate 37 to be forced down on the can-body after it has been put in the frame 28, and to this end said roller 44 is adapted to engage a plate 51, mounted in suitable supports 52 at the side of the machine, as shown in Fig. 3. The roller 44 runs under the plate 51, the ends of which are beveled, as shown, to facilitate the passage of the rollers 44 thereunder. Said plate 51 is so placed that when the rollers 44 pass under it the requisite pressure will be applied to the plate 38 and transmitted through the spring 42 to the cover-plate 37. Two of the plates 51 are provided—one at each side of the machine—and said plates preferably extend from near one end to near the other end of the machine, as shown in Fig. 3. The length of the plates 51 may be varied considerably; but they must not extend far enough over the cam-rails 49 to prevent the cover-plates 37 from being raised by said cam-rails.

53 indicates burners or heaters which extend along the sides of the machine at suitable points to heat the seams of the cans before they are discharged from the frames 28. As shown in Fig. 4, the burners 53 are arranged in pairs, the two burners of each pair being placed under the side seams of the can-bodies, so that both side seams will be heated at the same time. By thus placing the burners along the side seams the end seams are also heated sufficiently to melt the solder, since the flames from the burners may readily reach all parts of the short end seams.

54 indicates delivery-arms, one of which is provided near each end of the machine. As shown in Fig. 2, the delivery-arm 54 is mounted in the frame of the machine near the cam-plate 50, the operating end 55 of said arm lying near the farther end of the cam-plate 50. Said arm 54 is mounted on a vertical pivot 56, so that the arm rocks in a horizontal plane, the forward end 55 thereof lying normally slightly above and adjacent to the frame 28. A spring 57 serves to hold said arm 54 normally at one side of the path of the frames 28, but said arm is adapted to rock to carry its end 55 laterally across the frames 28, as will be hereinafter described. The rear end 58 of the arm 54 (shown in dotted lines in Fig. 2) extends across the path of the bosses 25 and is inclined downward, as shown in Fig. 6, so that as the carrier moves along the bosses 25 will strike the rear end 58 of said arm 54, thrusting it inward, thereby moving the forward end 55 thereof outward. After thus operating the arm 54 the bosses 25 pass under the arm 54 thereby disengaging it and permitting the spring 57 to restore it to its normal position. The timing of the parts is such that the bosses 25 strike the end 58 of the arm after a can-body has been raised out of the frame 28 and when such can-body arrives opposite the end 55 of said arm 54, so that the rocking of said arm causes the can-body to be moved laterally from over the frame 28 and deposited in any suitable receptacle placed to receive it.

The operation of my improved machine is as follows: The plates 38 and 37 being in the position shown in dotted lines in Fig. 5, which position they occupy at the ends of the machine, a can-top is first placed in the bottom of the frame 28, resting on the plate 34. The can-body having its lower surface coated with solder is then placed in the frame 28 on the top. As the carrier proceeds the roller 44, carried by the plate 38, comes in contact with the plate 51, passing under it, the top plate 37 being thereby forced down upon the can-body, pressing it closely upon the top. The burners 53 being by this time reached the seams to be united are heated, the solder being melted, and the parts soldered together. In order to cool the can-bodies properly after the soldering operation, air-pipes 59 are provided, said pipes being arranged to direct blasts of cold-air against the seams after they have passed the burners 53. The air-pipes are arranged similarly to the burners and may be of any suitable construction. When the can-bodies approach the end of the plate 51, they will be acted on by the cold-air blasts, thereby cooling the can-bodies sufficiently to permit of their being delivered from the machine without injury. When the cam-rail 49 is reached, the roller 47 will ride on it, being carried up by it, thereby lifting the plates 38 and 37 and permitting the can-body with the top attached to rise out of the frame 28 under the action of the cam-plate 50 upon the pin 36, which operates at this time. As soon as the soldered can clears the frame 28 it will be acted on by the arm 54, operated by one of the bosses 25, as above described, the can-body being thereby discharged at one side of the machine. A similar operation will at the same time take place at the opposite side of the machine, an operator being stationed at each end to supply the can tops and bodies.

It is of course not essential that a double-acting machine such as that described be employed, as my invention may be embodied in a single-acting machine.

I have described the machine illustrated specifically, but I wish it to be understood that my invention is not restricted to the specific details of the construction shown and described, except in so far as such details are specifically claimed.

That which I claim as my invention, and desire to secure by Letters Patent, is—

1. In a can-soldering machine, the combination of a carrier adapted to conduct can-bodies and having a frame corresponding in shape to the shape of the can-body, said frame being adapted to receive and support a can-body in contact with the top, means for heating the parts to be joined, and means for cooling the can-bodies after the soldering operation, substantially as described.

2. In a can-soldering machine, the combination of a carrier adapted to conduct can-bodies and having means for supporting a can-body in contact with the top, means for heating the parts to be joined, and means for directing air against the heated portions of the can, for cooling the same, substantially as described.

3. In a can-soldering machine, the combination of a carrier consisting of an endless belt, means for moving said carrier, a frame carried by said carrier, said frame being of a shape corresponding with that of the can-body, said frame being adapted to receive a can-body and a top therefor and hold them in contact with each other in position for soldering, means for heating the parts to be soldered as they are carried by said carrier, and means for discharging the soldered cans from the carrier, substantially as described.

4. In a can-soldering machine, the combination of a carrier consisting of an endless belt, means for operating said carrier, wheels carried by said carrier, tracks on which said wheels run, can-holding frames carried by said carrier, said can-holding frames being of a shape corresponding with that of the can-bodies, and being adapted to receive a can-top and a can-body resting on the top, and heating devices arranged below the carrier for heating the parts to be joined, substantially as described.

5. In a can-soldering machine, the combination of a carrier consisting of an endless belt, means for operating said carrier, wheels carried by said carrier, tracks on which said wheels run, can-holding frames carried by said carrier, said can-holding frames being of a shape corresponding with that of the can-bodies, and being adapted to receive a can-top and a can-body resting on the top, means for heating the parts to be joined, and means for pressing the can-body down upon the top while it is subjected to the heat, substantially as described.

6. In a can-soldering machine, the combination of a carrier consisting of an endless belt, means for operating said carrier, wheels carried by said carrier, tracks on which said wheels run, can-holding frames carried by said carrier, said can-holding frames being of a shape corresponding with that of the can-bodies, and being adapted to receive a can-top and a can-body resting on the top, heating devices arranged below the carrier for heating the parts to be joined, and means for discharging the cans from said can-holding frames after they have been soldered, substantially as described.

7. In a can-soldering machine, the combination of a carrier consisting of an endless belt, means for operating said carrier, wheels carried by said carrier, tracks on which said wheels run, can-holding frames carried by said carrier, said can-holding frames being of a shape corresponding with that of the can-bodies, and being adapted to receive a can-top and a can-body resting on the top, means for heating the parts to be joined, means for pressing the can-body down upon the top while it is subjected to the heat, and means for discharging the soldered cans from the can-holding frames, substantially as described.

8. In a can-soldering machine, the combination of a machine-frame, sprocket-wheels mounted therein, an endless belt operated by said wheels, can-holding frames carried by said belt, said frames corresponding in shape with the shape of the can-bodies, means for binding the can-bodies and tops together in said can-holding frames, and means for heating the parts to be joined, substantially as described.

9. In a can-soldering machine, the combination of a carrier consisting of an endless belt, can-holding frames carried thereby, said can-holding frames being adapted to receive a can-top and a can-body in contact with the top in position for soldering, hinged cover-plates for said can-holding frames, and mechanism for raising said cover-plates, substantially as described.

10. In a can-soldering machine, the combination of a carrier consisting of an endless belt, can-holding frames carried thereby, said can-holding frames being adapted to receive a can-top and a can-body in contact with the top in position for soldering, hinged cover-plates for said can-holding frames, mechanism for raising said cover-plates, and means for discharging the cans from said can-holding frames when the cover-plates are raised.

11. In a can-soldering machine, the combination of a carrier consisting of an endless belt, can-holding frames carried thereby, said can-holding frames being adapted to receive can tops and bodies, the can-bodies being in contact with the tops in position for soldering, a vertically-movable bottom plate in each of said can-holding frames, and means for raising said bottom plates to discharge the cans from said frames, substantially as described.

12. In a can-soldering machine, the combination of a carrier consisting of an endless belt, can-holding frames carried thereby, said can-holding frames being adapted to receive can tops and bodies, the can-bodies being in contact with the tops in position for soldering, a vertically-movable bottom plate in each of said can-holding frames, means for raising said bottom plates to discharge the cans from said frames, means for binding the can-bodies and tops in said frames, and means for releasing them before the bottom plate rises, substantially as described.

13. In a can-soldering machine, the combination of a carrier, can-holding frames carried thereby, said frames corresponding in shape to the shape of the can-bodies, and being adapted to receive can bodies and tops, means for heating the parts to be soldered, means for moving the soldered cans out of said can-holding frames, and means for discharging said cans laterally from the carrier, substantially as described.

14. In a can-soldering machine, the combination of a carrier, can-holding frames carried thereby, said frames corresponding in shape to the shape of the can-bodies and being adapted to receive can bodies and tops, means for heating the parts to be soldered, means for moving the soldered cans out of said can-holding frames, and a rocking arm for discharging the soldered cans laterally from the carrier, substantially as described.

15. In a can-soldering machine, the combination of a carrier, can-holding frames carried thereby, said frames corresponding in shape to the shape of the can-bodies being adapted to receive can bodies and tops, means for heating the parts to be soldered, means for moving the soldered cans out of said can-holding frames, a rocking arm for discharging the soldered cans laterally from the carrier, and means operated by the movement of the carrier for actuating said arm, substantially as described.

16. In a can-soldering machine, the combination of a carrier, can-holding frames carried thereby, said can-holding frames being adapted to receive a can-top and a can-body in contact with the top in position for soldering, hinged cover-plates for said can-holding frames, and mechanism for raising said cover-plates, substantially as described.

17. In a can-soldering machine, the combination of a carrier, can-holding frames carried thereby, said can-holding frames being adapted to receive a can-top and a can-body in contact with the top in position for soldering, cover-plates for said can-holding frames, and mechanism for raising said cover-plates, substantially as described.

18. In a can-soldering machine, the combination of a carrier, can-holding frames carried thereby, said can-holding frames being adapted to receive can tops and bodies, the can-bodies being in contact with the tops in position for soldering, a vertically-movable bottom plate in each of said can-holding frames, and means for raising said bottom plates to discharge the cans from said frames, substantially as described.

19. In a can-soldering machine, the combination of a carrier, can-holding frames carried thereby, said can-holding frames being adapted to receive can tops and bodies, the can-bodies being in contact with the tops in position for soldering, a vertically-movable bottom plate in each of said can-holding frames, means for raising said bottom plates to discharge the cans from said can-holding frames, and cover-plates for said can-holding frames, substantially as described.

20. In a can-soldering machine, the combination of a carrier, can-holding frames carried thereby, said can-holding frames being adapted to receive can tops and bodies, the can-bodies being in contact with the tops in position for soldering, a vertically-movable bottom plate in each of said can-holding frames, means for raising said bottom plates to discharge the cans from said can-holding frames, and hinged cover-plates for said can-holding frames, substantially as described.

21. In a can-soldering machine, the combination of a carrier, can-holding frames carried thereby, said frames being adapted to receive can bodies and tops, hinged plates mounted over said frames, spring-pressed cover-plates carried by said hinged plates, means for raising said cover-plates, and means for pressing said cover-plates down upon the can-bodies, substantially as described.

22. In a can-soldering machine, the combination of a carrier consisting of an endless belt, said carrier being arranged substantially in a horizontal plane, can-holding frames carried by said carrier and projecting outward therefrom, said can-holding frames being adapted to receive can tops and bodies, the can-bodies being in contact with the tops in position for soldering, means for heating the portions to be soldered, and means for discharging the can bodies and tops from said frames, substantially as described.

SAMUEL A. BAKER.

Witnesses:
JOHN L. JACKSON,
ALBERT H. ADAMS.